US010380145B2

(12) United States Patent
Kenthapadi et al.

(10) Patent No.: US 10,380,145 B2
(45) Date of Patent: Aug. 13, 2019

(54) UNIVERSAL CONCEPT GRAPH FOR A SOCIAL NETWORKING SERVICE

(71) Applicant: Microsoft Technology Licensing, LLC, Redmond, WA (US)

(72) Inventors: Krishnaram Kenthapadi, Sunnyvale, CA (US); Fedor Vladimirovich Borisyuk, Sunnyvale, CA (US); Parul Jain, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/052,359

(22) Filed: Feb. 24, 2016

(65) Prior Publication Data
US 2017/0242909 A1    Aug. 24, 2017

(51) Int. Cl.
| | | |
|---|---|---|
| G06F 17/30 | (2006.01) | |
| G06F 16/28 | (2019.01) | |
| H04L 29/08 | (2006.01) | |
| G06Q 50/00 | (2012.01) | |
| G06F 16/955 | (2019.01) | |

(52) U.S. Cl.
CPC ........ *G06F 16/287* (2019.01); *G06F 16/9558* (2019.01); *G06Q 50/01* (2013.01); *H04L 67/306* (2013.01)

(58) Field of Classification Search
CPC . G06F 17/30882; G06F 3/0484; G06Q 50/01; H04L 67/306
See application file for complete search history.

(56) References Cited

U.S. PATENT DOCUMENTS

| | | | | |
|---|---|---|---|---|
| 8,244,848 | B1 * | 8/2012 | Narayanan ............. | G06Q 50/01 709/218 |
| 9,154,847 | B2 * | 10/2015 | Rothschild ......... | H04N 21/4825 |
| 9,158,847 | B1 * | 10/2015 | Majumdar ............ | G06F 16/951 |

(Continued)

FOREIGN PATENT DOCUMENTS

WO    2017151899    9/2017

OTHER PUBLICATIONS

"International Application Serial No. PCT/US2017/020420, International Search Report dated May 11, 2017", 2 pgs.

(Continued)

*Primary Examiner* — Daniel A Kuddus
(74) *Attorney, Agent, or Firm* — Schwegman Lundberg & Woessner, P.A.

(57) ABSTRACT

A machine may be configured to generate a universal concept graph. For example, the machine generates an internal set of concept phrases based on an internal dataset including content from internal documents associated with a social networking service (SNS). The machine generates an external set of concept phrases based on an external dataset including content from external documents that are external to the SNS. The machine generates a set of nodes for a universal concept graph based on performing a union operation of the internal set of concept phrases and the external set of concept phrases. Each node corresponds to a particular concept phrase. The machine generates a set of edges among a plurality of nodes of the set of nodes based on one or more relationship indicators for pairs of nodes. The machine generates the universal concept graph based on the set of nodes and the set of edges.

17 Claims, 15 Drawing Sheets

(56) References Cited

U.S. PATENT DOCUMENTS

| | | | | |
|---|---|---|---|---|
| 2011/0004692 | A1* | 1/2011 | Occhino | H04L 67/16 709/228 |
| 2012/0221581 | A1* | 8/2012 | Narayanan | H04W 4/21 707/748 |
| 2012/0330869 | A1* | 12/2012 | Durham | G06N 5/022 706/16 |
| 2013/0095864 | A1* | 4/2013 | Marovets | H04W 4/14 455/466 |
| 2013/0254213 | A1* | 9/2013 | Cheng | G06Q 50/01 707/748 |
| 2014/0214943 | A1* | 7/2014 | Shapero | H04L 51/32 709/204 |
| 2014/0330819 | A1* | 11/2014 | Raina | G06F 16/9535 707/723 |
| 2014/0330869 | A1* | 11/2014 | Factor | G06F 21/6218 707/783 |
| 2015/0254371 | A1 | 9/2015 | Zhang et al. | |
| 2015/0379113 | A1* | 12/2015 | Wang | G06F 17/30598 707/738 |
| 2016/0012119 | A1* | 1/2016 | Franceschini | G06F 16/338 707/722 |
| 2016/0224547 | A1* | 8/2016 | Agrawal | G06F 16/93 |
| 2017/0255621 | A1 | 9/2017 | Kenthapadi et al. | |

OTHER PUBLICATIONS

"International Application Serial No. PCT/US2017/020420, Written Opinion dated May 11, 2017", 13 pgs.

Non Final Office Action Issued in U.S. Appl. No. 15/061,296, dated Jul. 30, 2018, 20 Pages.

Agrawal, et al. "Similarity Search Using Concept Graphs", Retrieved From: http://www.sreenivasgollapudi.com/pubs/cikm2014b.pdf, 2014, pp. 719-728.

International Preliminary Report on Patentability issued in International Application Serial No. PCT/US2017/020420, dated Sep. 13, 2018, 15 Pages.

* cited by examiner

UNIVERSAL CONCEPT GRAPH FOR A SOCIAL NETWORKING SERVICE

TECHNICAL FIELD

The present application relates generally to the processing of data, and, in various example embodiments, to systems, methods, and computer program products for generating a universal concept graph.

BACKGROUND

Many social networking services, such as Facebook or the professional social networking service LinkedIn®, make recommendations to their users. These recommendations may pertain to people with whom to connect, articles to read, jobs for which to apply, etc. The quality and relevance of such recommendations may be heavily dependent on the underlying representation of various content items used to generate such recommendations. Examples of content items or objects are a member profile, a job posting, a SlideShare article, a Pulse article, etc.

Today, the quality of many recommendations suffers from the problem of vocabulary mismatch between different content types. For example, if a member profile of a member of a social networking service (also referred to herein as "SNS") and a job description use different terminologies to refer to the same underlying concept, the SNS may fail to match the member profile to the job description, and to recommend the respective job to the member.

To address this problem, it may be beneficial to an SNS to generate a universal concept graph that includes a unified and standardized set of concept phrases that may be used to generate better recommendations to the members of the SNS.

BRIEF DESCRIPTION OF THE DRAWINGS

Some embodiments are illustrated by way of example and not limitation in the figures of the accompanying drawings, in which.

DETAILED DESCRIPTION

Figure 1:
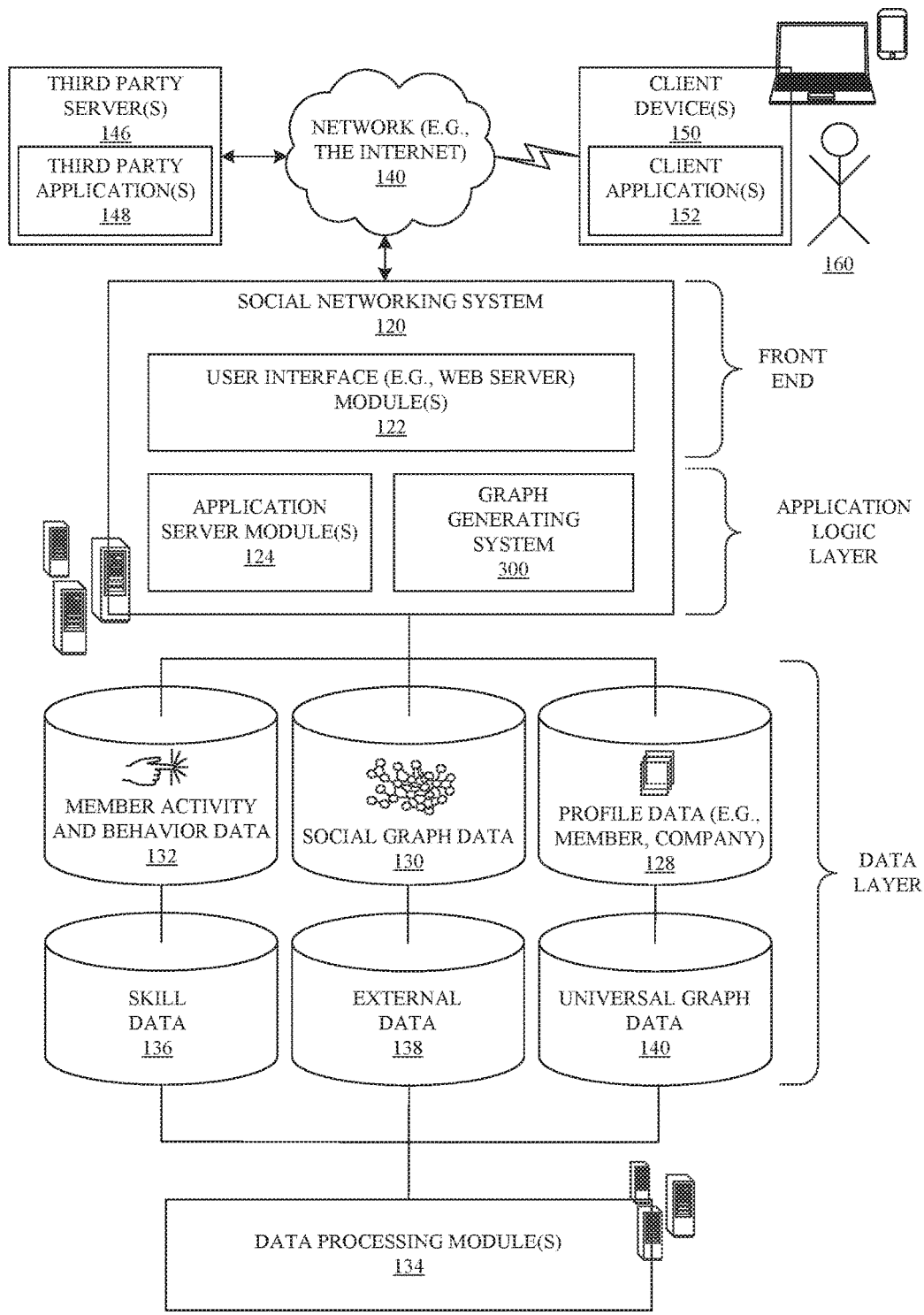
FIG. 1 is a network diagram illustrating a client-server system, according to some example embodiments.

Example methods and systems for generating a universal concept graph are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Often social networking services, such as Facebook or the professional social networking service LinkedIn®, make recommendations to their users. Examples of recommendations made by a SNS to a member of the SNS are a recommendation to connect to another member of the SNS, a recommendation to read a particular article, a recommendation of a job made to a particular member of the SNS, or a recommendation of a particular member of the SNS made to a recruiter for a particular job. Whether such a recommendation is acted upon by the recommendee often depends on whether the content associated with the recommendation is relevant to the recommendee. Generally, a particular content is relevant to a recommendee if the recommending system performs a highly accurate match between the data pertaining to the recommendee (e.g., a member profile of a recommendee, a set of skills of the recommendee, a set of preferences of the recommendee, etc.) and the content of the content item being recommended to the recommendee. Examples of content items are a member profile, a job posting, a SlideShare article, a Pulse article, etc.

Today, the quality of many recommendations suffers from the problem of vocabulary mismatch between different content types. In some instances, because a member profile of a member of a social networking service (also referred to herein as "SNS") and a job description are written by different people, the member profile and the job description most likely use different terminologies to refer to the same underlying concept. Therefore, the SNS may fail to match the member profile to the job description, and to recommend the respective job to the member. For example, if the member profile uses the term "dentistry," and the job description uses the term "dentist," the SNS may fail to determine that the member profile is a match for the job description, and therefore may fail to recommend the respective job to the member.

Similarly, in certain instances, if the member profile and the job description use synonyms to refer to the same underlying concept, the SNS may fail to match the member profile to the job description, and to recommend the respective job to the member. For example, if the member profile uses the term "Patent Attorney," and the job description uses the term "Patent Lawyer." the SNS may fail to determine that the member profile is a match for the job description, and therefore may fail to recommend the respective job to the member.

To address this problem, it may be beneficial to an SNS to generate a universal concept graph that includes a unified and standardized set of concept phrases that may be used to generate better recommendations to the members of the SNS. A graph generating system may construct the universal concept graph based on combining internal concept phrases extracted from internal data assets (e.g., a set of member profiles, a set of skills, a set of occupation titles, a set of educational course names, etc.) of the SNS with external concept phrase extracted from external datasets, such as Wikipedia or Freebase. In some instances, external datasets, such as Wikipedia or Freebase, include a linkage structure among the documents (e.g., articles) published by these sites. The linkage structure (e.g., hyperlinks in a first document point to one or more other documents) may facilitate a better understanding of the relationships among the concepts linked by the linkage structure. The graph generating system may leverage the linkage structure of the external datasets to complement the knowledge about concept phrases and the knowledge about the relationships among concept phrases provided by the internal assets of the SNS in building the universal graph.

The universal concept graph may be leveraged for determining a set of key concepts in a given content object, by mining not just the information present in the content object, but also data from external sources that have been included in the universal concept graph.

The graph generating system may also use the universal concept graph to determine member-job and job-member similarity score values that may facilitate the generation of more accurate job recommendations and talent match identifications.

In some example embodiments, the graph generating system generates, at a particular time, an internal set of concept phrases based on an internal dataset that includes content from one or more internal documents associated with an SNS. The graph generating system also generates, at the particular time, an external set of concept phrases based on an external dataset that includes content from one or more external documents that are external to the SNS. The graph generating system generates a set of nodes for a universal concept graph (also referred to herein as "UCG") based on performing a union operation of the internal set of concept phrases and the external set of concept phrases, each node corresponding to a particular concept phrase. The graph generating system generates a set of edges among a plurality of nodes of the set of nodes based on one or more relationship indicators for pairs of nodes of the set of nodes. The graph generating system generates the universal concept graph based on the set of nodes and the set of edges among the plurality of nodes.

The graph generating system may periodically update the universal concept graph to add new nodes and edges for new concept phrases and relationships among the nodes of the universal concept graph. The updating of the universal concept graph may be based on new external article titles and content of articles, as well as new internal documents. For example, Wikipedia provides a data dump of all the Wikipedia pages as one structured dataset. The graph generating system may access a previous data dump that was used for generating a previous version of the universal concept graph (e.g., from a database), and the current data dump from Wikipedia. The graph generating system may compare the previous data dump and the current data dump, and may determine what has changed (e.g., what concepts and relationships between concepts are new, what concepts or relationships should be removed, etc.) in the current data dump. The graph generating system may add or remove nodes, edges, or both based on the comparison of the previous data dump and the current data dump, and the determination of what has changed in the current data dump.

According to various example embodiments, the graph generating system generates a universal concept graph based on internal assets (e.g., a set of skills, a set of job titles, a set of locations, a set of names of companies, a set of names of universities, a set of job descriptions, a set of news articles, and associated content and linkages) of the SNS, and external structured datasets (e.g., data provided by Wikipedia or Freebase). The universal concept graph may evolve with time, as the underlying information changes over time.

Accordingly, the graph generating system may use as input (1) a time t, (2) internal assets (e.g., documents, records, datasets, etc.) of the SNS, and (3) one or more external structured datasets to generate an output: a universal concept graph, $H_{UCG}=(V_{UCG}, E_{UCG}, w)$ at time t, where UCG is the universal concept graph, $V_{UCG}$ is a set of nodes of the universal concept graph, $E_{UCG}$ is a set of edges of the universal concept graph, and w is a weight of an edge. The weight of the edge between two nodes may indicate the degree of relatedness of the two concept phrases represented by the two nodes. In some instances, the weight of the edge takes a value between "0.00" and "1.00." In some example embodiments, the universal concept graph is represented as $H_{UCG}=(V_{UCG}, E_{UCG})$ when no weights are assigned to the edges of the universal concept graph.

In certain example embodiments, the graph generating system determines the set of nodes $V_{UCG}$ for the universal concept graph by taking the union of the set of concept phrases obtained (e.g., extracted, identified, determined, etc.) from internal sources $V_{int}$ and the set of concept phrases obtained from the external dataset $V_{ext}$: $V_{UCG}=V_{int} \cup V_{ext}$.

$V_{ext}$ denotes the set of external concept phrases obtained from the external structured dataset at time t. In certain example embodiments, $V_{ext}$ corresponds to the set of titles of articles in Wikipedia.

$V_{int}$ denotes the set of internal concept phrases obtained from the internal assets at time t. This set can correspond to one or more (e.g., all) names of skills, occupation titles, educational course names, locations, names of companies, names of universities, etc. identified from the internal data sources of the SNS. These internal concept phrases may be mapped to the external dataset (e.g., external concept phrases from the external dataset) to obtain canonical versions of the internal concept phrases. The determining of the canonical versions of the internal concept phrases may facilitate the avoidance of duplication of concept phrases when taking the union of the set of internal concept phrases and the set of external concept phrases.

For example, the internal dataset uses the concept phrase "Software Developer," while the external dataset (e.g., Wikipedia) uses the concept phrase "Software Engineer." To obtain the canonical version of every phrase, the graph generating system may use the redirection mechanism associated with the external dataset. For instance, the graph generating system issues a query to a device storing the external dataset. The query includes the term "Software Developer." In response to the query from the graph generating system, the device storing the external dataset automatically redirects the query to the page corresponding to the canonical version (e.g., Software Engineer) of the term included in the query. There could be a chain of redirects. Following the chain of redirects and mapping every term in the internal dataset to the corresponding canonical version of the term is one way to standardize (e.g., unify, consolidate, etc.) the used terminology to a single vocabulary for the purpose of building the universal concept graph.

The graph generating system determines the set of relationship edges $E_{UCG}$, and the edge weight function w, by taking into account the hyperlink structure and the content similarity in the internal and external datasets.

According to various example embodiments, $V_{UCG}$ is defined only in terms of either $V_{ext}$ or $V_{int}$, instead of taking the union of $V_{ext}$ and $V_{int}$.

Consistent with some example embodiments, the edges of the universal graph do not have weights associated with them and, accordingly, the universal concept graph is an unweighted graph. In some example embodiments, where u and v represent a first and second nodes of the universal concept graph (e.g., the first and second nodes corresponding to a first and second concept phrases, respectively), the graph generating system determines that an edge (u,v) connects the first node u and the second node v of the universal concept graph if (e.g., if and only if) there is a hyperlink from the article page corresponding to u in the external dataset to the article page corresponding to v in the external dataset. In some example embodiments, the edge (u,v) is included in the universal concept graph if (e.g., if and only if) the hyperlink is present in both directions (e.g., a hyperlinks to v, and v hyperlinks to u).

In some example embodiments, the graph generating system determines that an edge (u,v) connects the first node u and the second node v of the universal concept graph if (e.g., if and only if) there is a hyperlink (e.g., a reference) from the web page corresponding to u in the SNS to the web page corresponding to v in the SNS. In some example embodiments, the edge (u,v) is included in the universal concept graph if (e.g., if and only if) the hyperlink (e.g., the reference) is present in both directions (e.g., u hyperlinks to v, and v hyperlinks to u).

In some example embodiments, the graph generating system determines that an edge (u,v) connects the first node u and the second node v of the universal concept graph if (e.g., if and only if) a weighted Jaccard similarity value between the content of the documents corresponding to the two nodes u and v (e.g., article pages in the external dataset, a member profile and a job description, etc.) exceeds a threshold value. In some instances, a document (e.g., an article) associated with a concept phrase is represented in terms of the underlying terms, along with their frequency counts. For example, if the content of a document is "software spark scala software," then the document is represented as {(software, 2), (spark, 1), (scala, 1)}.

In some example embodiments, the graph generating system determines that an edge (u,v) connects the first node u and the second node v of the universal concept graph if (e.g., if and only if) the concept phrase corresponding to the first node u and the concept phrase corresponding to the second node v co-occur significantly within the internal dataset of the SNS, within the external dataset, or within both. Significant co-occurrence can be defined as both concept phrases occurring together within a unit of text (e.g., a paragraph, a particular number of sentences, a set of words, etc.) at least a particular number of times in a dataset or a combination of datasets.

In various example embodiments, the universal concept graph is a weighted graph. In a weighted graph, the edges among the nodes of the graph have weights associated with them. According to various example embodiments, the set of edges $E_{UCG}$ includes only edges associated with non-zero (e.g., positive) weights. In some example embodiments, where u and v represent a first and second nodes of the universal concept graph (e.g., the first and second nodes corresponding to a first and second concept phrases, respectively), the graph generating system determines that an edge (u,v) connects the first node u and the second node v of the universal concept graph if (e.g., if and only if) there is hyperlink from the article page corresponding to u in the external dataset to the article page corresponding to v in the external dataset. The edge weight is either 0 or 1, depending on whether the edge exists. In some example embodiments, the edge (u,v) is included in the universal concept graph if (e.g., if and only if) the hyperlink is present in both directions (e.g., u hyperlinks to v, and v hyperlinks to u).

In some example embodiments, the graph generating system determines that an edge (u,v) connects the first node u and the second node v of the universal concept graph if (e.g., if and only if) there is a hyperlink (e.g., a reference) from the web page corresponding to u in the SNS to the web page corresponding to v in the SNS. The edge weight is either 0 or 1, depending on whether the edge exists. In some example embodiments, the edge (u,v) is included in the universal concept graph if (e.g., if and only if) the hyperlink (e.g., the reference) is present in both directions (e.g., u hyperlinks to v, and v hyperlinks to u).

In some example embodiments, the graph generating system determines that the weight of an edge (u,v) between two nodes u and v equals the weighted Jaccard similarity value between the content of the documents corresponding to the two nodes u and v (e.g., article pages in the external dataset, a member profile and a job description, etc.). In some instances, a document (e.g., an article) associated with a concept phrase is represented in terms of the underlying terms, along with their frequency counts. For example, if the content of a document is "software spark scala software," then the document is represented as {(software, 2), (spark, 1), (scala, 1)}.

In some example embodiments, the graph generating system determines that the weight of an edge (u,v) between two nodes u and v equals the number of co-occurrences of the concept phrases corresponding to the nodes u and v within the internal dataset of the SNS, within the external dataset, or within both, divided by a normalizing factor. Co-occurrence can be defined as both concept phrases occurring together within a unit of text (e.g., a paragraph, a particular number of sentences, a set of words, a document, etc.) in an internal or external dataset, or in a combination of datasets.

In some example embodiments, the graph generating system determines a weighted combination of the above-described weight functions based on a machine-learning model that uses linear regression or logistic regression techniques. The model is "taught" (e.g., trained) with respect to a ground truth dataset, wherein each item in the ground truth dataset corresponds to a pair of sample concepts (u,v) that are related. For each pair (u,v), the graph generating system computes one or more weight values (e.g., intermediate weight values) using different weight functions. The graph generating system also receives a ground truth weight value that could be provided by a judge. The judge may be a person whose role is to perform an analysis of the relationship between concepts u and v of the pair of concepts (u,v), and to determine a ground truth weight value that reflects the degree of relatedness of concepts u and v. Based on the ground truth weight value provided by the judge (e.g., via a user interface of a client device associated with the judge), the graph generating system associates the ground truth weight with the pair of concepts (u,v) as the current weight value of the edge between the nodes that represent concepts u and v in the universal concept graph. Based on the ground truth weight values provided for all the items in the ground truth dataset, the graph generating system uses the machine-learning model to determine the logic behind the allocation, by the human judge, of certain ground truth weight values to the sample concept pairs ground truth dataset, and to determine, using the logic, what the current edge weight values associated with the remainder of the edges in the universal concept graph should be considering all the intermediate weight values computed for a respective edge.

According to various example embodiments, the set of nodes $V_{UCG}$ is defined as the union of the set of all skills, occupation titles, educational course names, locations, company names, and university names identified based on the internal dataset of the SNS. The set of edges $E_{UCG}$ is defined based on the hyperlink structure of an external dataset (e.g., Wikipedia). For example, the graph generating system determines that an edge (u,v) exists between a first node u and a second node v of the universal concept graph if (e.g., if and only if) there is a hyperlink in the external dataset (e.g., Wikipedia) from the article page corresponding to the first node u in the external dataset to the article page corresponding to the second node v in the external dataset.

Consistent with some example embodiments, the graph generating system stores the universal concept graph in memory of a single machine, or distributed in memory across a number of machines. The universal concept graph should be easily queried by a number of applications that utilize the universal concept graph for computing subgraphs, making job recommendations, identifying candidates for jobs, etc.

For efficient retrieval of edges and computation of subgraphs, the graph generating system may create the following indices:
1. <source_node>→List of (destination_node, weight) tuples, ordered by decreasing weight; Corresponds to the list of nodes that are adjacent to a given node.
2. <source_node, destination_node>→weight; Corresponds to the list of valid edges, along with weights.

An example method and system for generating a universal concept graph may be implemented in the context of the client-server system illustrated in FIG. 1. As illustrated in FIG. 1, the graph generating system 300 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

In some example embodiments, members may receive recommendations targeted to them based on various factors (e.g., member profile data, social graph data, member activity or behavior data, etc.). According to certain example embodiments, one or more members may receive career-related communications targeted to the one or more members based on various factors (e.g., member profile data, social graph data, member activity or behavior data, etc.). The recommendations or career-related communications may be associated with (e.g., included in) various types of media, such as InMail, Display Ads, Sponsored Updates, etc. Based on the interactions by the one or more members with the media or the content of the media, the interest of the one or more members in the advertising or career-related communications may be ascertained.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

According to some example embodiments, the graph generating system 300 generates a universal concept graph based on an internal set of concept phrases extracted from an internal dataset and an external set of concept phrases extracted from an external dataset. The internal dataset may include content from one or more internal documents associated with the SNS, and the external dataset may include content from one or more external documents that are external to the SNS. The internal set of concept phrases may include data stored in profile database 128, skill database 136, or any other internal database of the SNS. In some example embodiments, the external dataset includes articles published on Wikipedia or Freebase, and is represented by external database 138. In some example embodiments, the external dataset is a collection (e.g., repository, dictionary, etc.) of terms that may be used as a reference of canonical versions of concept phrases. The collection of terms may be stored as external data in database 138. The graph generating system 300 may store the universal concept graph in universal graph database 140.

Other applications and services may be separately embodied in their own application server modules 124. As illustrated in FIG. 1, social networking system 120 may include the graph generating system 300, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, skill data, external data, or universal graph data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers of a large-scale distributed storage and processing framework, such as Hadoop servers, for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
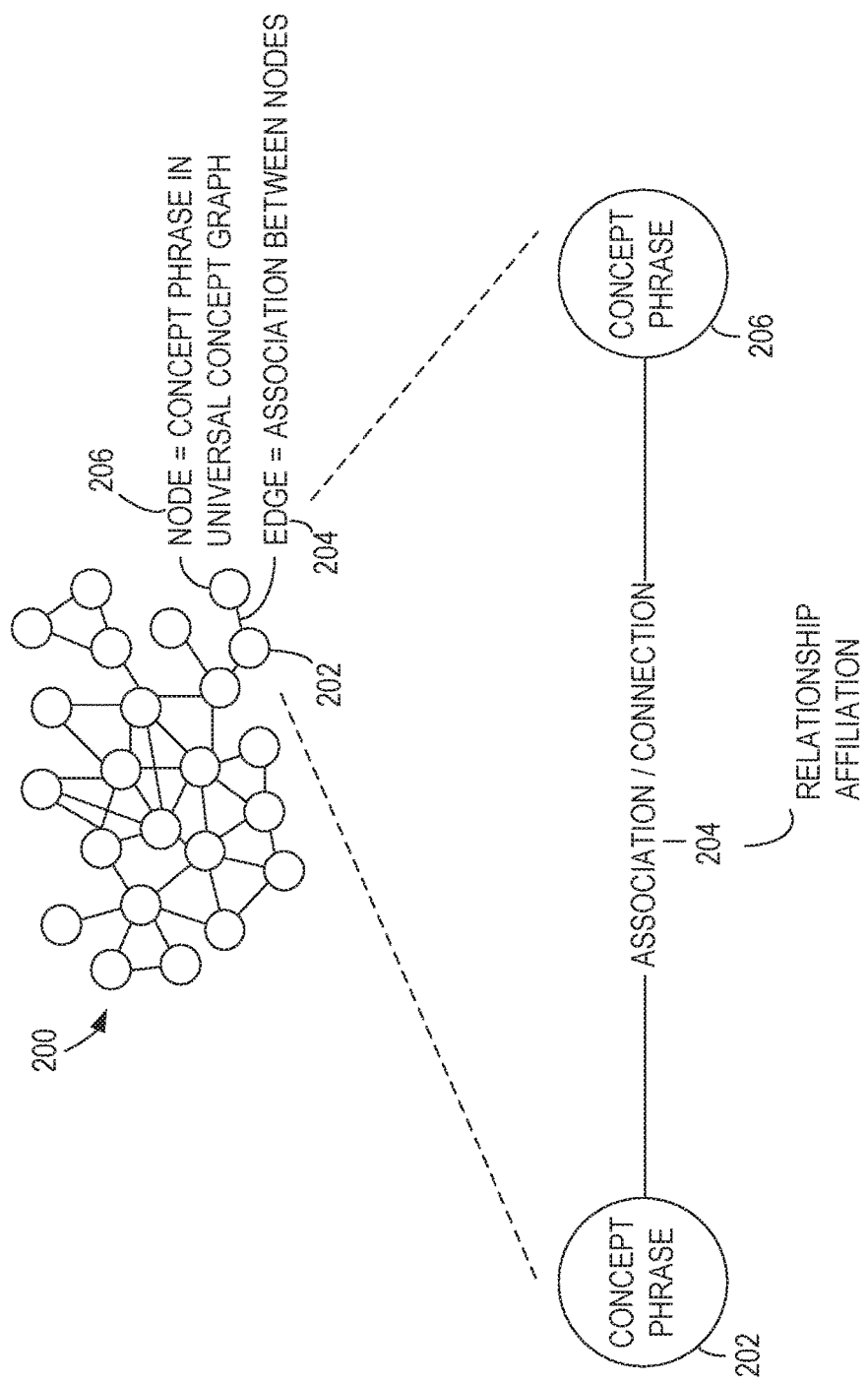
FIG. 2 is a diagram illustrating an example portion of a graph data structure for modelling a universal concept graph, consistent with some example embodiments.

FIG. 2 is a block diagram illustrating an example portion of a graph data structure 200 for implementing a universal concept graph, according to some example embodiments. As illustrated in FIG. 2, the graph data structure 200 consists of nodes connected by edges. For instance, the node with reference number 202 is connected to the node with reference number 206 by means of the edge with reference number 204. Each node in the graph data structure represents a concept phrase in the universal concept graph. The edges that connect any two nodes can represent a wide variety of different associations (e.g., connections). In general, an edge may represent a relationship, an affiliation, a commonality, or some other affinity shared between concept phrase 202 and concept phrase 206. For example, the concept phrase 202 is "Java," and the concept phrase 206 is "C++." The concept phrase 202 and the concept phrase 206 may be related based on both being programming languages. According to another example, the concept phrase 202 is "Patent Attorney," and the concept phrase 206 is "Copyright Attorney." The concept phrase 202 and the concept phrase 206 may be related based on both being Intellectual Property Attorneys.

Figure 3:
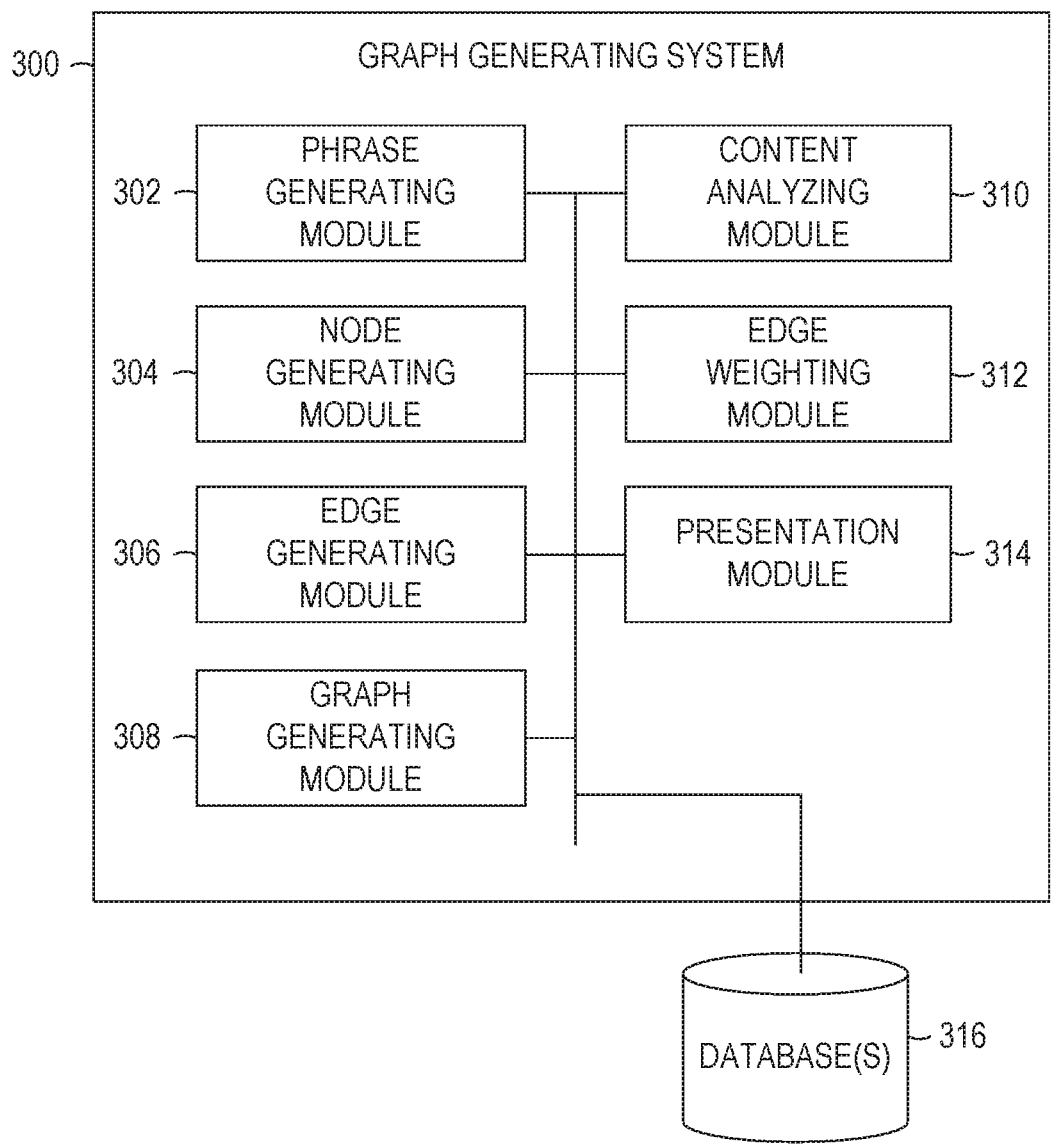
FIG. 3 is a block diagram illustrating components of a graph generating system, according to some example embodiments.

FIG. 3 is a block diagram illustrating components of the graph generating system 300, according to some example embodiments. As shown in FIG. 3, the graph generating system 300 includes a phrase generating module 302, a node generating module 304, an edge generating module 306, a graph generating module 308, a content analyzing module 310, an edge weighting module 312, and a presentation module 314, all configured to communicate with each other (e.g., via a bus, shared memory, or a switch).

According to some example embodiments, the phrase generating module 302 generates, at a particular time, an internal set of concept phrases based on an internal dataset that includes content from one or more internal documents associated with an SNS. In certain example embodiments, the internal set of concept phrases includes at least one of a skill, an occupation title, an educational course name, a location, a company name, or a university name.

In some example embodiments, the generating of the internal set of concept phrases includes: generating a first set of tokens based on a content of an internal document (e.g., words included in an internal document) of the one or more documents; and generating a canonical version of one or more tokens in the first set of tokens based on mapping the one or more tokens to one or more external concept phrases in the external dataset, wherein the internal set of concept phrases includes the canonical version of the one or more tokens. Each token in the first set of tokens may include one or more keywords (e.g., unigrams, bigrams, trigrams, etc.) comprised in the internal document. The generating of tokens may include stemming of one or more words included in the internal document. In some example embodiments, the internal document is a member profile of a member of the SNS.

The phrase generating module 302 also generates, at the particular time, an external set of concept phrases based on an external dataset that includes content from one or more external documents that are external to the SNS. In certain example embodiments, the external set of concept phrases includes at least one of an article title of an article included in the external dataset or a keyword identified by a hyperlink in the article.

In some example embodiments, the generating of the external set of concept phrases includes: identifying one or more titles of the one or more external documents included in the external dataset; and generating one or more tokens for each of the one or more titles based on parsing the one or more titles of the one or more external documents, wherein the external set of concept phrases includes the one or more tokens. In certain example embodiments, the title is obtained from the structured attributes/metadata associated with a document. For example. Wikipedia allows the download of the entire corpus of articles available at Wikipedia. Each Wikipedia article includes the content of the article. In addition, each Wikipedia article also includes the title of the article, the "last edited" time, categories, and other metadata associated with the article. Based on the metadata associated with an article, the phrase generating module 302 may identify the title of the article.

The node generating module 304 generates a set of nodes for a universal concept graph based on performing a union operation of the internal set of concept phrases and the external set of concept phrases, each node corresponding to a particular concept phrase. The particular concept phrase may correspond to an identifier (e.g., a title) of an internal document or an identifier of an external document.

The edge generating module 306 generates a set of edges among a plurality of nodes of the set of nodes based on one or more relationship indicators for pairs of nodes of the set of nodes.

The graph generating module 308 generates the universal concept graph based on the set of nodes and the set of edges among the plurality of nodes.

The content analyzing module 310 determines a relationship indicator of the one or more relationship indicators based on analyzing contents of documents associated with a pair of nodes. In some example embodiments, the determining of the relationship indicator comprises identifying a hyperlink included in a first document associated with a first document title that corresponds to a first node of the pair of nodes. The hyperlink may be directed to a second document associated with a second document title that corresponds to a second node of the pair of nodes. In some example embodiments, the determining of the relationship indicator includes determining a similarity value associated with the pair of nodes based on a content similarity between a first document associated with a first document title that corresponds to a first node of the pair of nodes and a second document associated with a second document title that corresponds to a second node of the pair of nodes.

In some example embodiments, the content analyzing module 310 determines a percentage of content overlap between a first document associated with a first title that corresponds to a first node in a pair of nodes of the set of nodes and a second document associated with a second title that corresponds to a second node in the pair of nodes. The pair of nodes may be connected by an edge of the set of edges.

The edge weighting module 312 associates an edge weight with the edge based on the percentage of content overlap between the first document and the second document. For example, a higher percentage of overlapping content corresponds to a higher weight value associated with the edge.

In some example embodiments, the content analyzing module 310 determines a percentage of members of the SNS associated with member profiles that include a first concept phrase corresponding to a first node of a pair of nodes of the set of nodes and a second concept phrase corresponding to a second node of the pair of nodes. The pair of nodes may be connected by an edge of the set of edges.

The edge weighting module 312 associates an edge weight with the edge based on the percentage of members of the SNS associated with member profiles that include the first concept phrase and the second concept phrase.

The presentation module 314 causes a presentation of at least a portion of the universal concept graph in a user interface of a device associated with a user.

To perform one or more of its functionalities, the graph generating system 300 may communicate with one or more other systems. For example, an integration engine may integrate the graph generating system 300 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 316 (e.g., database 128, 130, 132, 136, 138, or 140).

Figure 4:
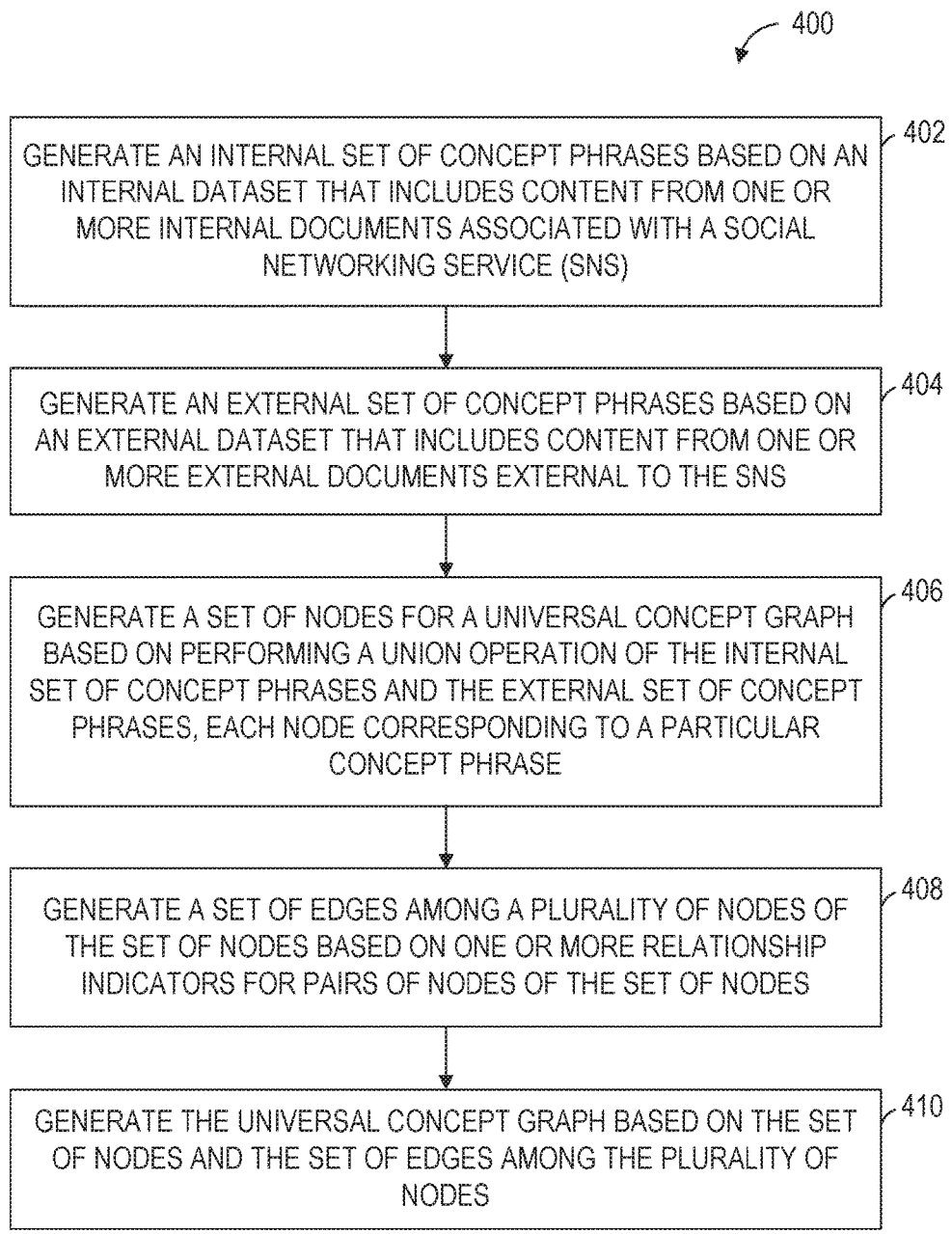
FIG. 4 is a flowchart illustrating a method for generating a universal concept graph, according to some example embodiments.

FIGS. 4-12 are flowcharts illustrating a method for generating a universal concept graph, according to some example embodiments. The operations of method 400 illustrated in FIG. 4 may be performed using modules described above with respect to FIG. 3. As shown in FIG. 4, method 400 may include one or more of method operations 402, 404, 406, 408, and 410, according to some example embodiments.

At operation 402, the phrase generating module 302 generates, at a particular time, an internal set of concept phrases based on an internal dataset that includes content from one or more internal documents associated with an SNS. In certain example embodiments, the internal set of concept phrases includes at least one of a skill, an occupation title, an educational course name, a location, a company name, or a university name At operation 404, the phrase generating module 302 generates, at a particular time, an external set of concept phrases based on an external dataset that includes content from one or more external documents that are external to the SNS. In certain example embodiments, the external set of concept phrases includes at least one of an article title of an article included in the external dataset or a keyword identified by a hyperlink in the article.

At operation 406, the node generating module 304 generates a set of nodes for a universal concept graph based on performing a union operation of the internal set of concept phrases and the external set of concept phrases, each node corresponding to a particular concept phrase. The particular concept phrase may correspond to an identifier (e.g., a title) of an internal document or an identifier of an external document.

At operation 408, the edge generating module 306 generates a set of edges among a plurality of nodes of the set of nodes based on one or more relationship indicators for pairs of nodes of the set of nodes.

At operation 410, the graph generating module 308 generates the universal concept graph based on the set of nodes and the set of edges among the plurality of nodes. Further details with respect to the operations of the method 400 are described below with respect to FIGS. 5-12.

Figure 5:
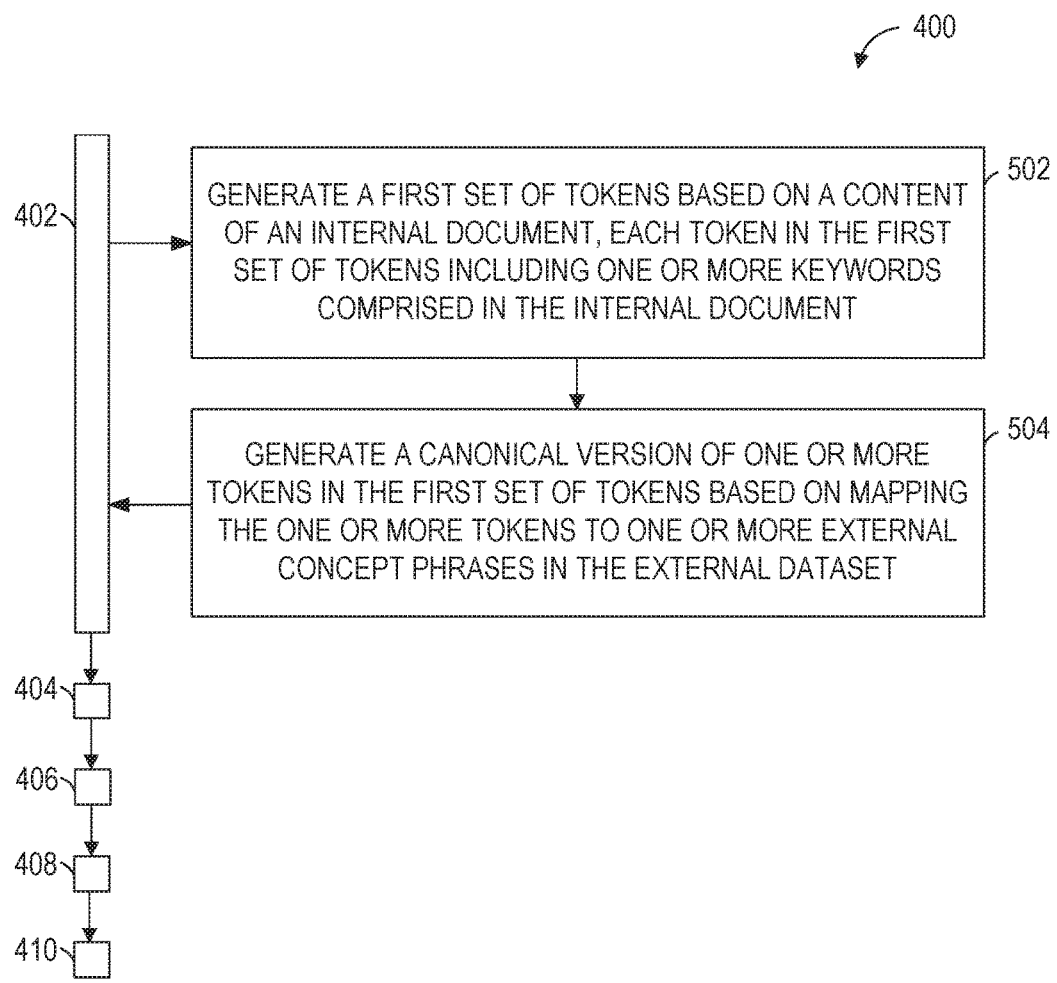
FIG. 5 is a flowchart illustrating a method for generating a universal concept graph, and representing step 402 of the method illustrated in FIG. 4 in more detail, according to some example embodiments.

As shown in FIG. 5, method 400 may include one or more of operations 502 and 504, according to some example embodiments. Operation 502 may be performed as part (e.g., a precursor task, a subroutine, or a portion) of operation 402, in which the phrase generating module 302 generates, at a particular time, an internal set of concept phrases based on an internal dataset that includes content from one or more internal documents associated with an SNS.

At operation 502, the phrase generating module 302 generates a first set of tokens based on a content of an internal document (e.g., words included in an internal document) of the one or more documents. Each token in the first set of tokens may include one or more keywords comprised in the internal document. In some example embodiments, the internal document is a member profile of a member of the SNS. In some example embodiments, the internal document is a set of professional skills.

Operation 504 may be performed after operation 502. At operation 504, the phrase generating module 302 generates a canonical version of one or more tokens in the first set of tokens based on mapping the one or more tokens to one or more external concept phrases in the external dataset. The internal set of concept phrases may include the canonical version of the one or more tokens.

Figure 6:
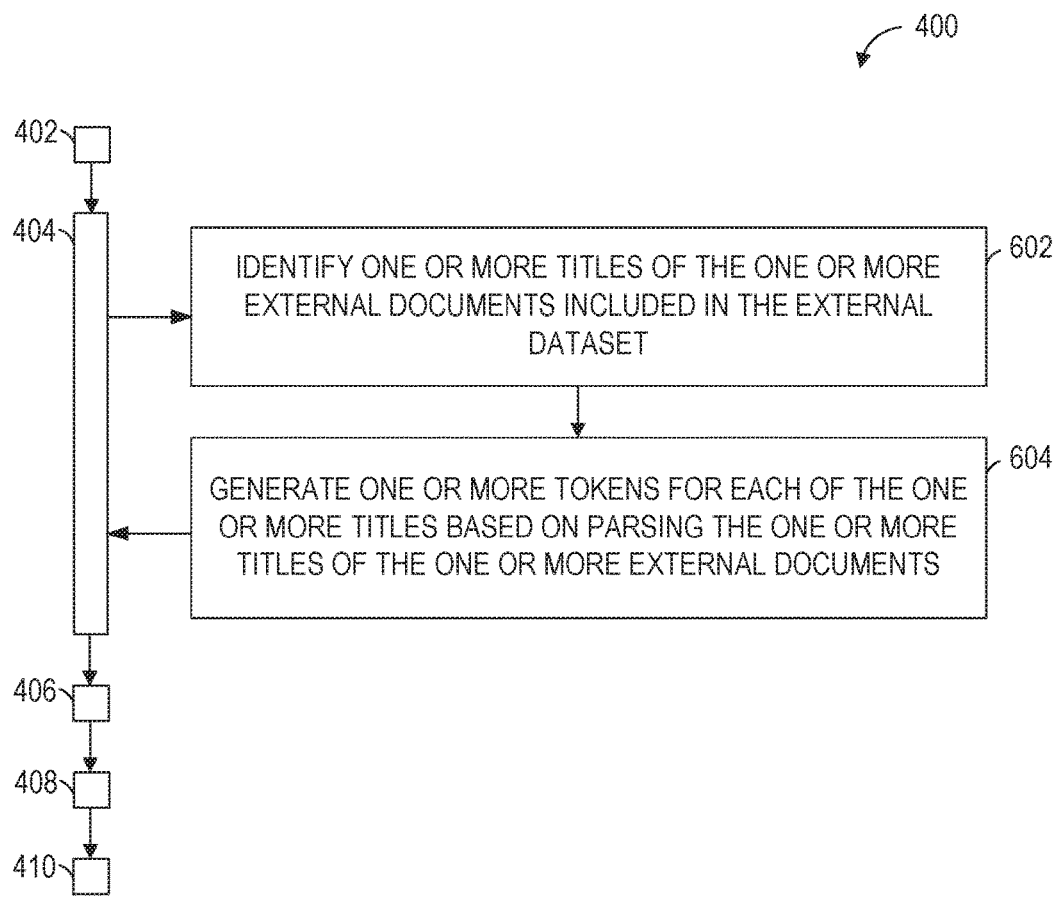
FIG. 6 is a flowchart illustrating a method for generating a universal concept graph, and representing step 404 of the method illustrated in FIG. 4 in more detail, according to some example embodiments.

As shown in FIG. 6, method 400 may include one or more of operations 602 and 604, according to some example embodiments. Operation 602 may be performed as part (e.g., a precursor task, a subroutine, or a portion) of operation 404, in which the phrase generating module 302 generates, at a particular time, an external set of concept phrases based on an external dataset that includes content from one or more external documents that are external to the SNS. At operation 602, the phrase generating module 302 identifies one or more titles of the one or more external documents included in the external dataset.

Operation 604 may be performed after operation 602. At operation 604, the phrase generating module 302 generates one or more tokens for each of the one or more titles based on parsing the one or more titles of the one or more external documents, wherein the external set of concept phrases includes the one or more tokens.

Figure 7:
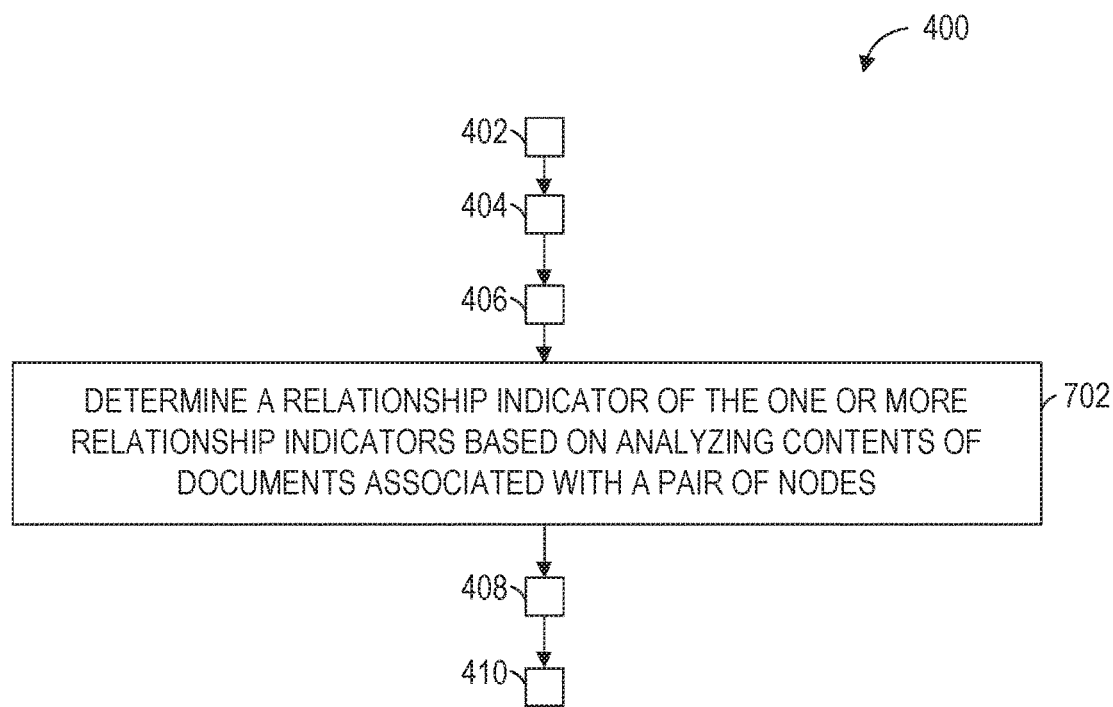
FIG. 7 is a flowchart illustrating a method for generating a universal concept graph, and representing an additional step of the method illustrated in FIG. 4, according to some example embodiments.

As shown in FIG. 7, method 400 may include operation 702, according to some example embodiments. Operation 702 may be performed after operation 406, in which the node generating module 304 generates a set of nodes for a universal concept graph based on performing a union operation of the internal set of concept phrases and the external set of concept phrases, each node corresponding to a particular concept phrase.

At operation 702, the content analyzing module 310 determines a relationship indicator of the one or more relationship indicators based on analyzing contents of documents associated with a pair of nodes.

Figure 8:
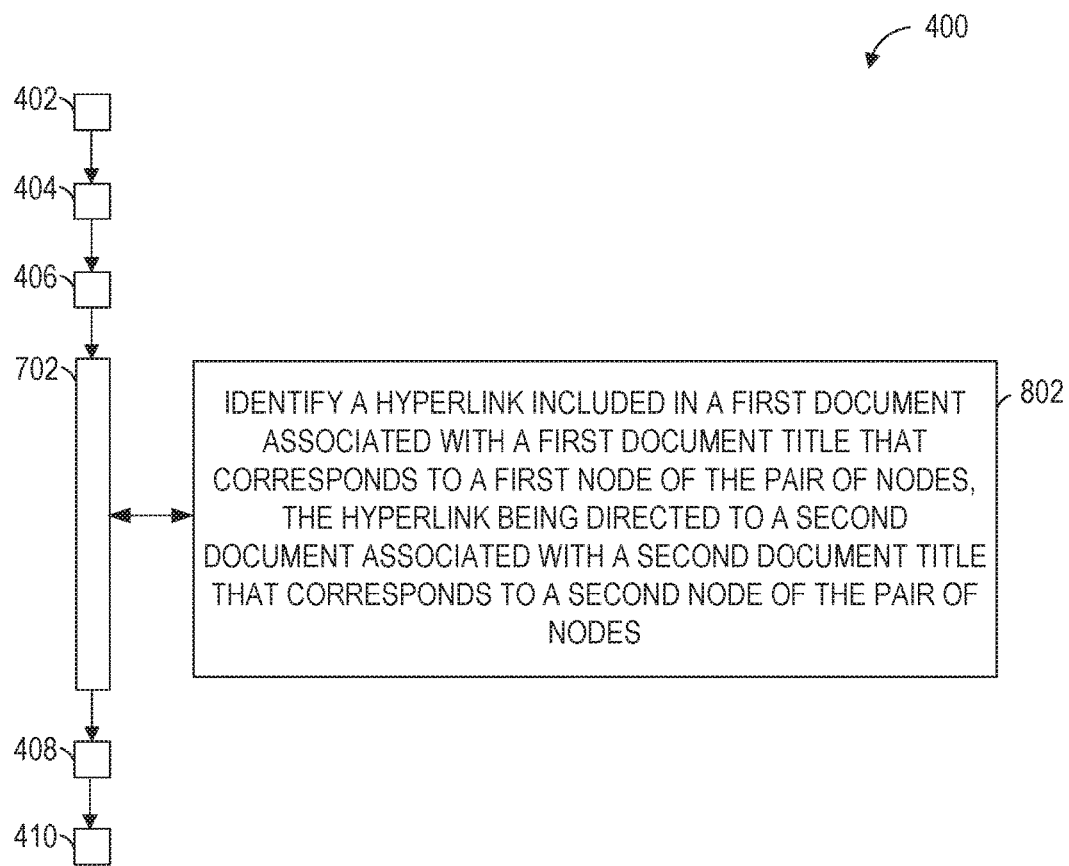
FIG. 8 is a flowchart illustrating a method for generating a universal concept graph, and representing step 702 of the method illustrated in FIG. 7 in more detail, according to some example embodiments.

As shown in FIG. 8, method 400 may include operation 802, according to some example embodiments. Operation 802 may be performed as part (e.g., a precursor task, a subroutine, or a portion) of operation 702 of method 400 illustrated in FIG. 7, in which the content analyzing module 310 determines a relationship indicator of the one or more relationship indicators based on analyzing contents of documents associated with a pair of nodes.

At operation 802, the content analyzing module 310 identifies a hyperlink included in a first document associated with a first document title that corresponds to a first node of the pair of nodes. The hyperlink may be directed to a second document associated with a second document title that corresponds to a second node of the pair of nodes.

Figure 9:
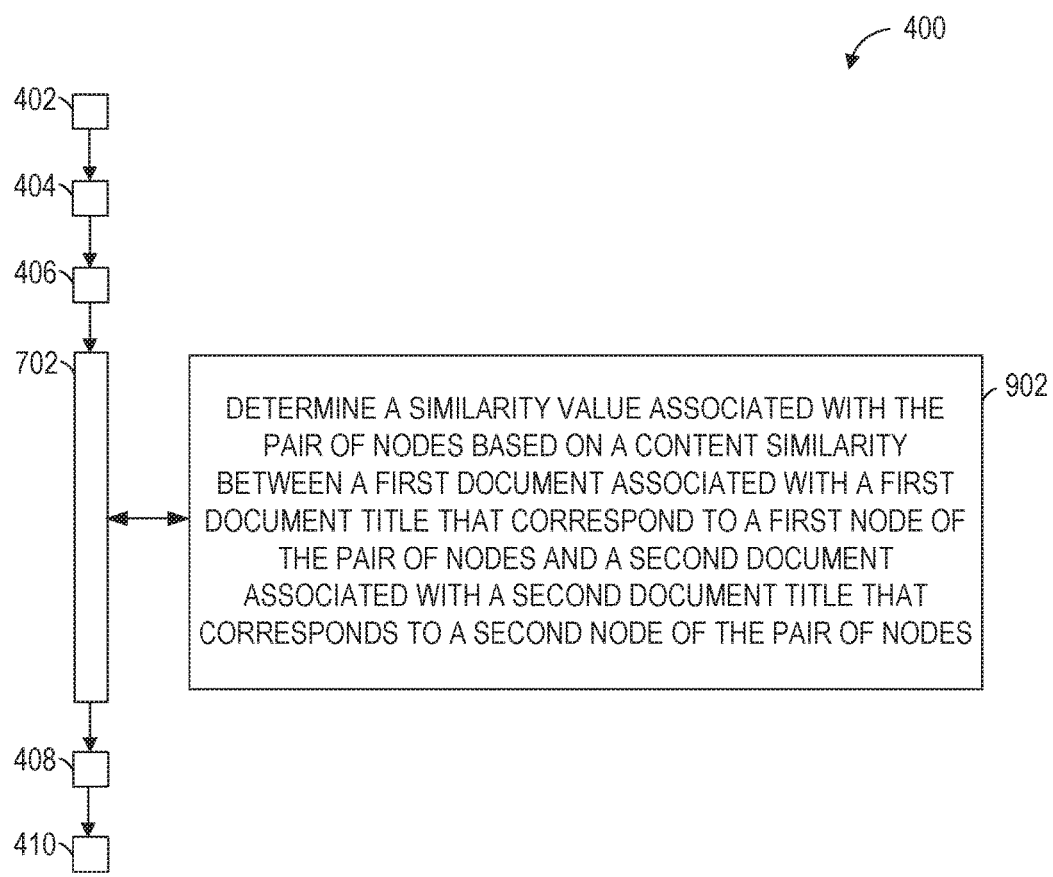
FIG. 9 is a flowchart illustrating a method for generating a universal concept graph, and representing step 702 of the method illustrated in FIG. 7 in more detail, according to some example embodiments.

As shown in FIG. 9, method 400 may include operation 902, according to some example embodiments. Operation 902 may be performed as part (e.g., a precursor task, a subroutine, or a portion) of operation 702 of method 400 illustrated in FIG. 7, in which the content analyzing module 310 determines a relationship indicator of the one or more relationship indicators based on analyzing contents of documents associated with a pair of nodes.

At operation 902, the content analyzing module 310 determines a similarity value associated with the pair of nodes based on a content similarity between a first document associated with a first document title that corresponds to a first node of the pair of nodes and a second document associated with a second document title that corresponds to a second node of the pair of nodes.

Figure 10:
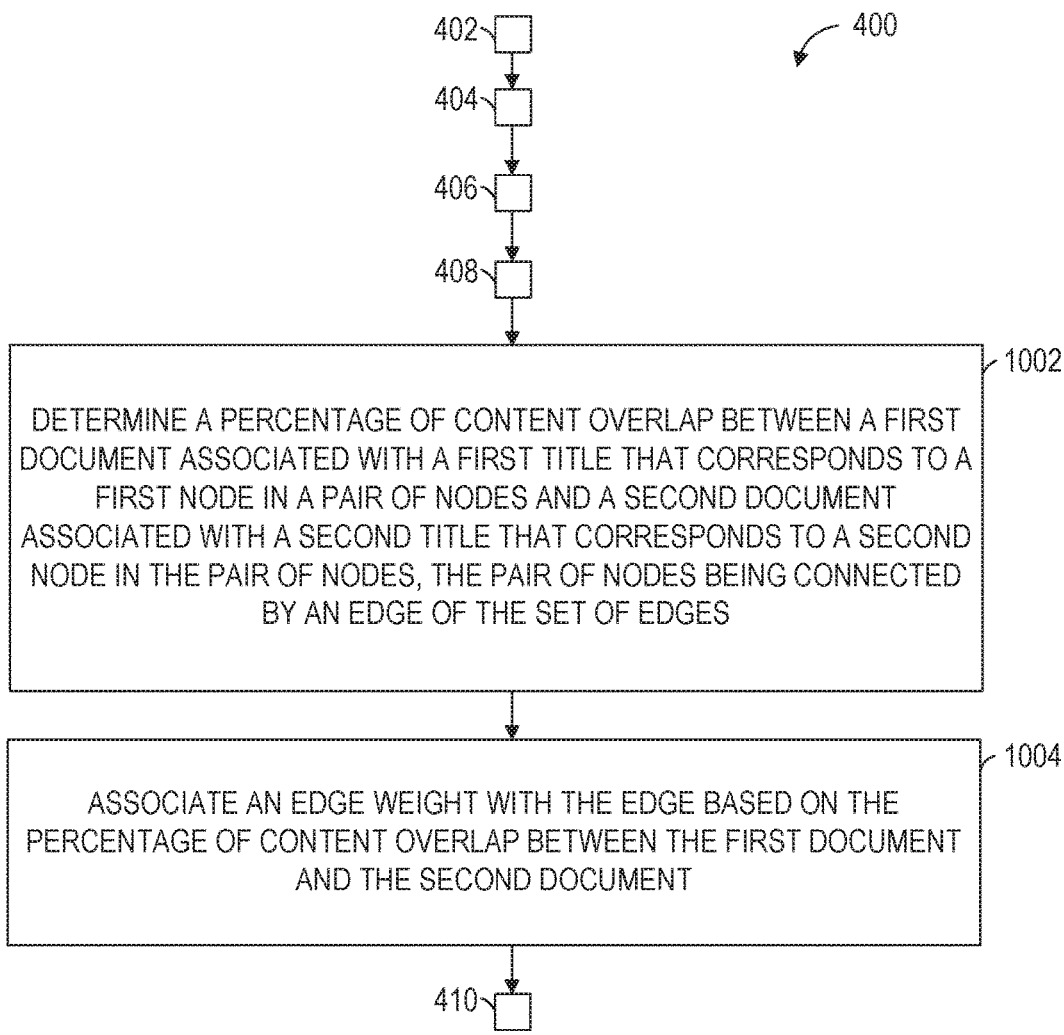
FIG. 10 is a flowchart illustrating a method for generating a universal concept graph, and representing additional steps of the method illustrated in FIG. 4, according to some example embodiments.

As shown in FIG. 10, method 400 may include one or more of operations 1002 and 1004, according to some example embodiments. Operation 1002 may be performed after operation 408, in which the edge generating module 306 generates a set of edges among a plurality of nodes of the set of nodes based on one or more relationship indicators for pairs of nodes of the set of nodes.

At operation 1002, the content analyzing module 310 determines a percentage of content overlap between a first document associated with a first title that corresponds to a first node in a pair of nodes of the set of nodes and a second document associated with a second title that corresponds to a second node in the pair of nodes. The pair of nodes may be connected by an edge of the set of edges.

Operation 1004 may be performed after operation 1002. At operation 1004, the edge weighting module 312 associates an edge weight with the edge based on the percentage of content overlap between the first document and the second document.

Figure 11:
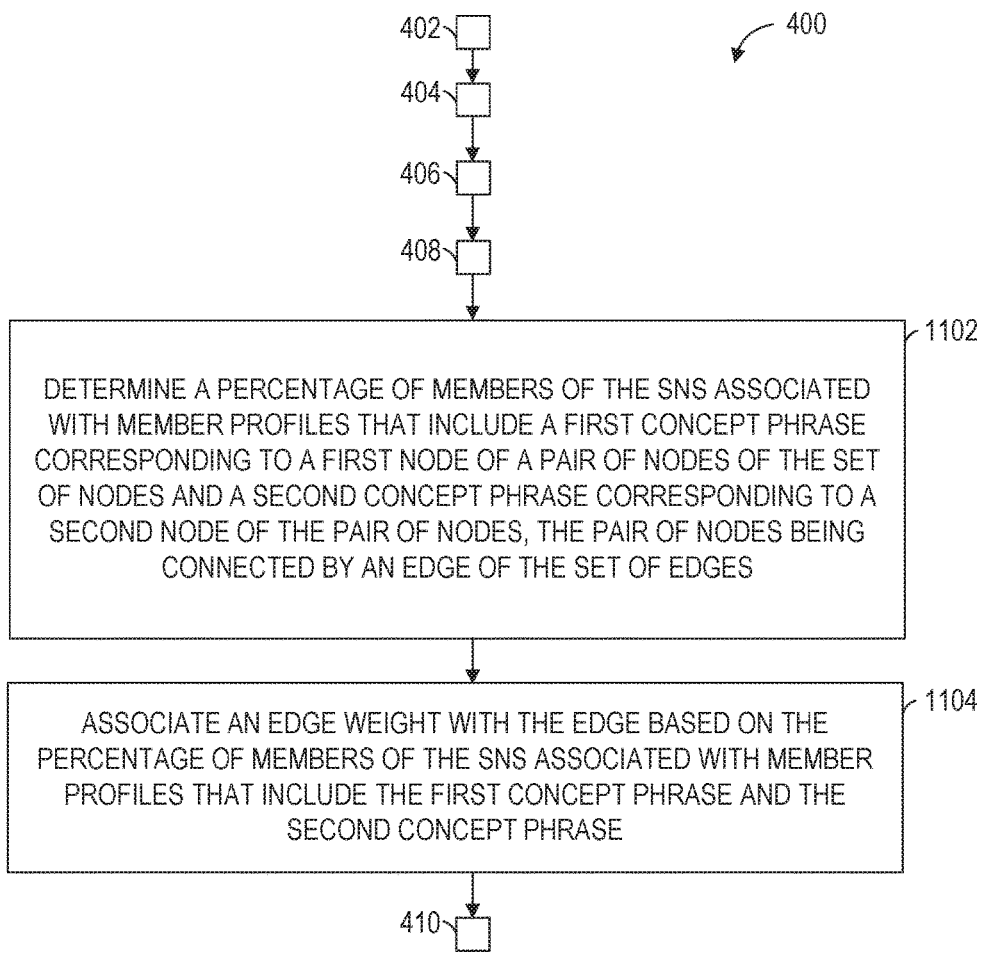
FIG. 11 is a flowchart illustrating a method for generating a universal concept graph, and representing additional steps of the method illustrated in FIG. 4, according to some example embodiments.

As shown in FIG. 11, method 400 may include one or more of operations 1102 and 1104, according to some example embodiments. Operation 1102 may be performed after operation 408, in which the edge generating module 306 generates a set of edges among a plurality of nodes of the set of nodes based on one or more relationship indicators for pairs of nodes of the set of nodes.

At operation 1102, the content analyzing module 310 determines a percentage of members of the SNS associated with member profiles that include a first concept phrase corresponding to a first node of a pair of nodes of the set of nodes and a second concept phrase corresponding to a second node of the pair of nodes, the pair of nodes being connected by an edge of the set of edges.

Operation 1104 may be performed after operation 1102. At operation 1104, the edge weighting module 312 associates an edge weight with the edge based on the percentage of members of the SNS associated with member profiles that include the first concept phrase and the second concept phrase.

Figure 12:
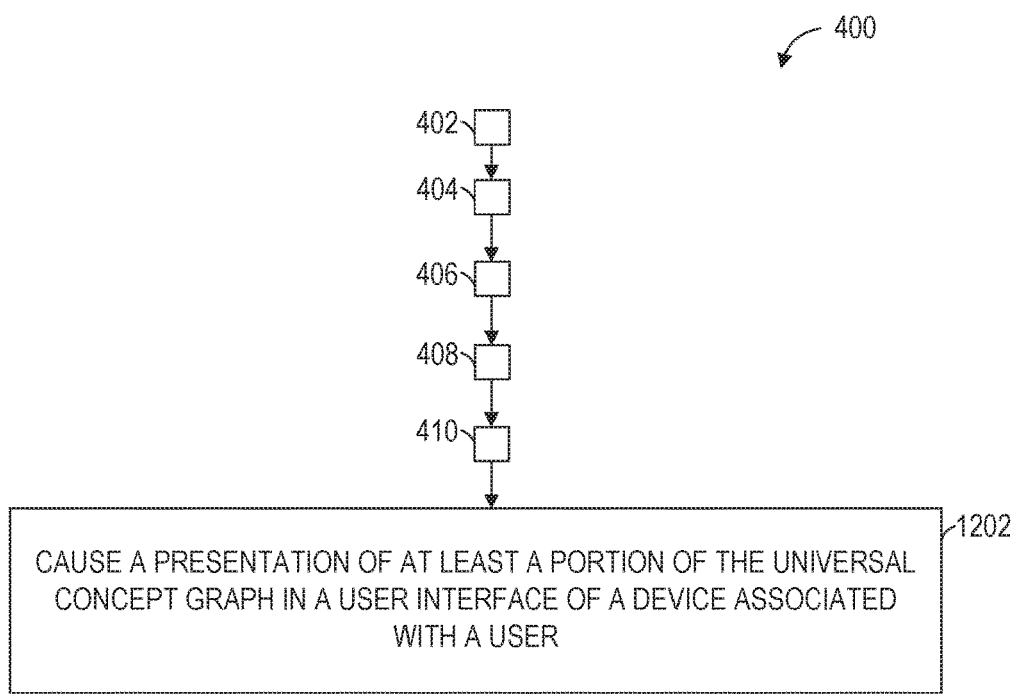
FIG. 12 is a flowchart illustrating a method for generating a universal concept graph, and representing an additional step of the method illustrated in FIG. 4, according to some example embodiments.

As shown in FIG. 12, method 400 may include operation 1202, according to some example embodiments. Operation 1202 may be performed after operation 410, in which the graph generating module 308 generates the universal concept graph based on the set of nodes and the set of edges among the plurality of nodes.

At operation 1202, the presentation module 314 causes a presentation of at least a portion of the universal concept graph in a user interface of a device associated with a user.

Figure 13:
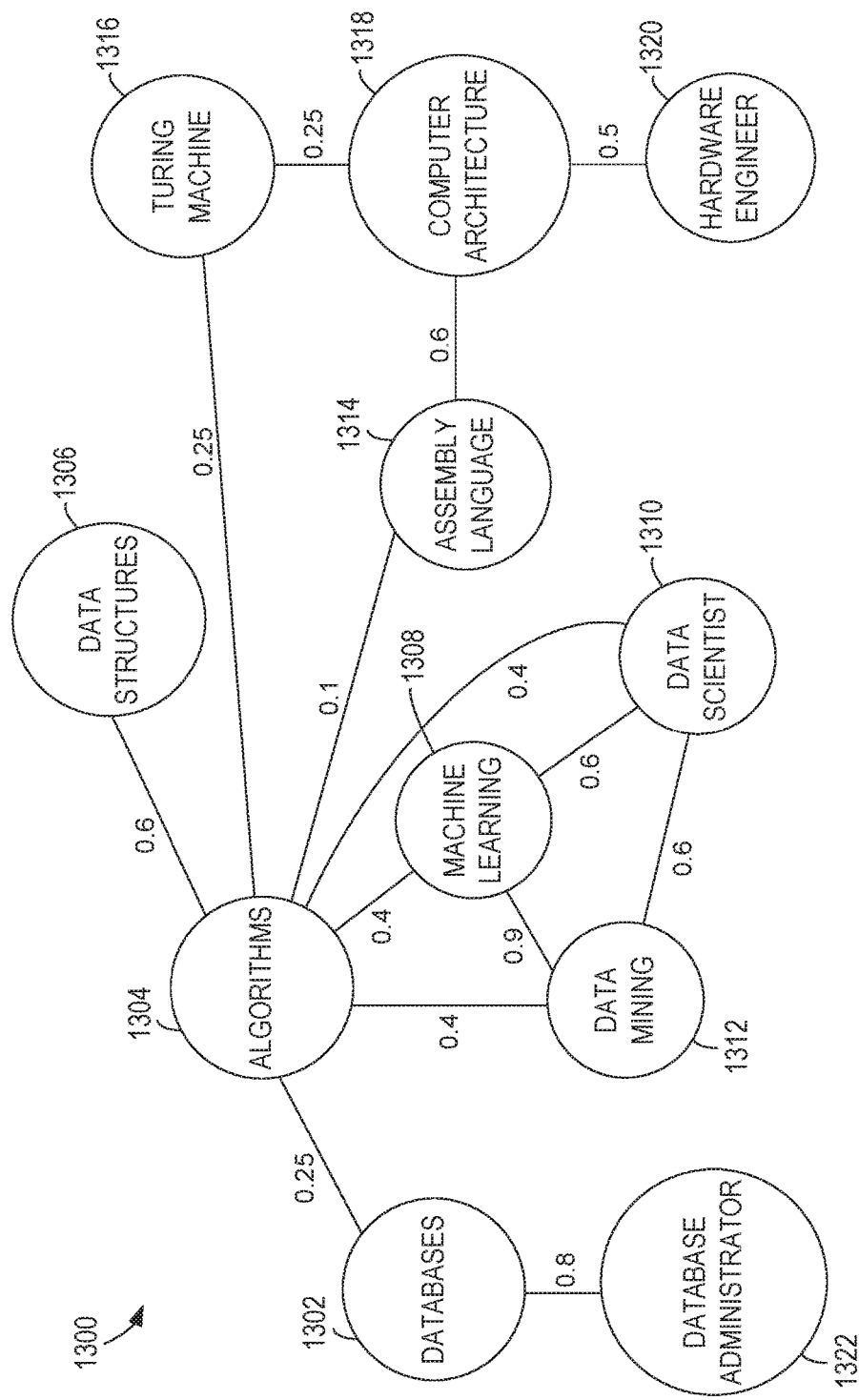
FIG. 13 is a diagram illustrating an example portion of the universal concept graph, consistent with some example embodiments.

FIG. 13 is a diagram illustrating an example portion of the universal concept graph, consistent with some example embodiments. As illustrated in FIG. 13, the example portion 1300 of the universal concept graph consists of a number of nodes connected by a number of edges. Each node in the example portion 1300 of the universal concept graph represents a concept phrase in the universal concept graph. The edges that connect any two nodes can represent a wide variety of different associations (e.g., connections). In general, an edge may represent a relationship, an affiliation, a commonality, or some other affinity shared between a pair of concept phrases.

For instance, the node with reference number 1302 represents the concept phrase "databases," and is connected to the node with reference number 1304 (representing the concept phrase "algorithms") by a first edge, and to the node with reference number 1322 (representing the concept phrase "database administrator") by a second edge. The existence of these edges indicates the existence of relationships between the respective concept phrases.

In some example embodiments, each edge between two nodes of the universal concept graph is associated with a weight value. The edge value may represent the degree of relatedness between the two concept represented by the two nodes connected by the edge. For example, the node 1304 that represents the concept phrase "algorithms" is connected to numerous other nodes, such as node 1312 representing the concept phrase "data mining," node 1306 representing the concept phrase "data structures," and node 1314 representing the concept phrase "Assembly language." The edge between node 1304 and node 1312 is associated with an edge weight value of "0.4." The edge between node 1304 and node 1306 is associated with an edge weight value of "0.6." In some instances, the difference between these two edge weight values indicates that the phrase "algorithms" is more closely related to the concept phrase "data structures" than to the concept phrase "data mining."

The edge between node 1304 and node 1314 is associated with an edge weight value of "0.1." The low value of the edge weight between these two nodes indicates that the concept phrases "algorithms" and "Assembly language" are not closely related.

As shown in FIG. 13, the example portion 1300 of the universal concept graph, in some example embodiments, includes concept phrases that correspond to skills (or knowledge) of the members of the SNS (e.g., node, 1302, node 1304, node 1306, node 1308, node 1310, node 1312, node 1314, node 1316, and node 1318). The example portion 1300 of the universal concept graph also includes concept phrases that correspond to job titles (e.g., node 1322 and node 1320).

In some example embodiments, the edges connecting a node representing a particular job title and a node representing a particular skill may be weighted to indicate how important the particular skill is to the job associated with the particular job title. For example, node 1322 that represents the concept phrase "database administrator," a job title phrase, is connected by an edge to node 1302 that represents the concept phrase "databases," a skill phrase. The edge is associated with the edge weight value of "0.8," which indicates that the concept phrase "databases" is highly related to the concept phrase "database administrator." and that the skill "databases" is highly important to the job associated with the job title "database administrator."

Example Mobile Device

Figure 14:
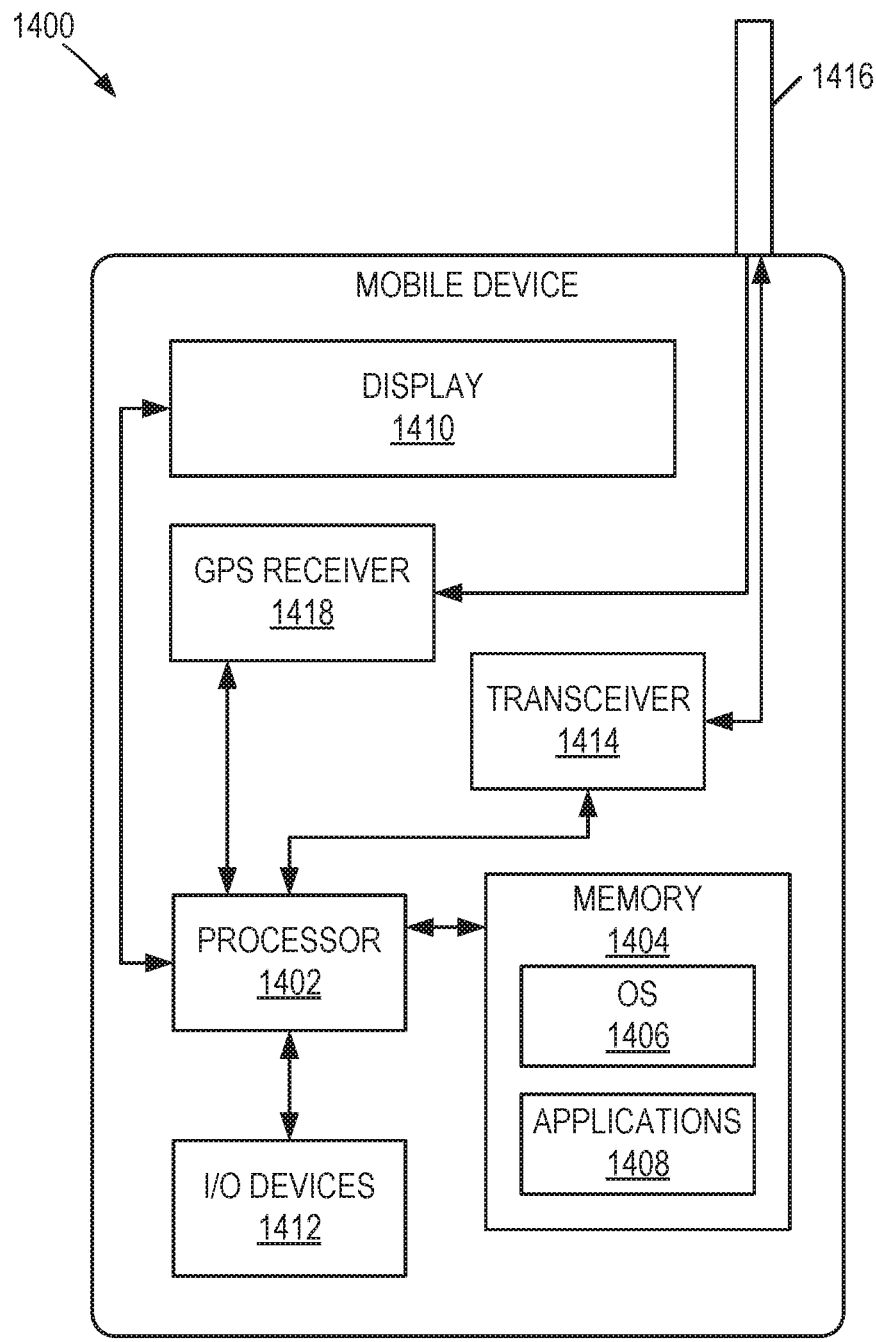
FIG. 14 is a block diagram illustrating a mobile device, according to some example embodiments.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product. e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
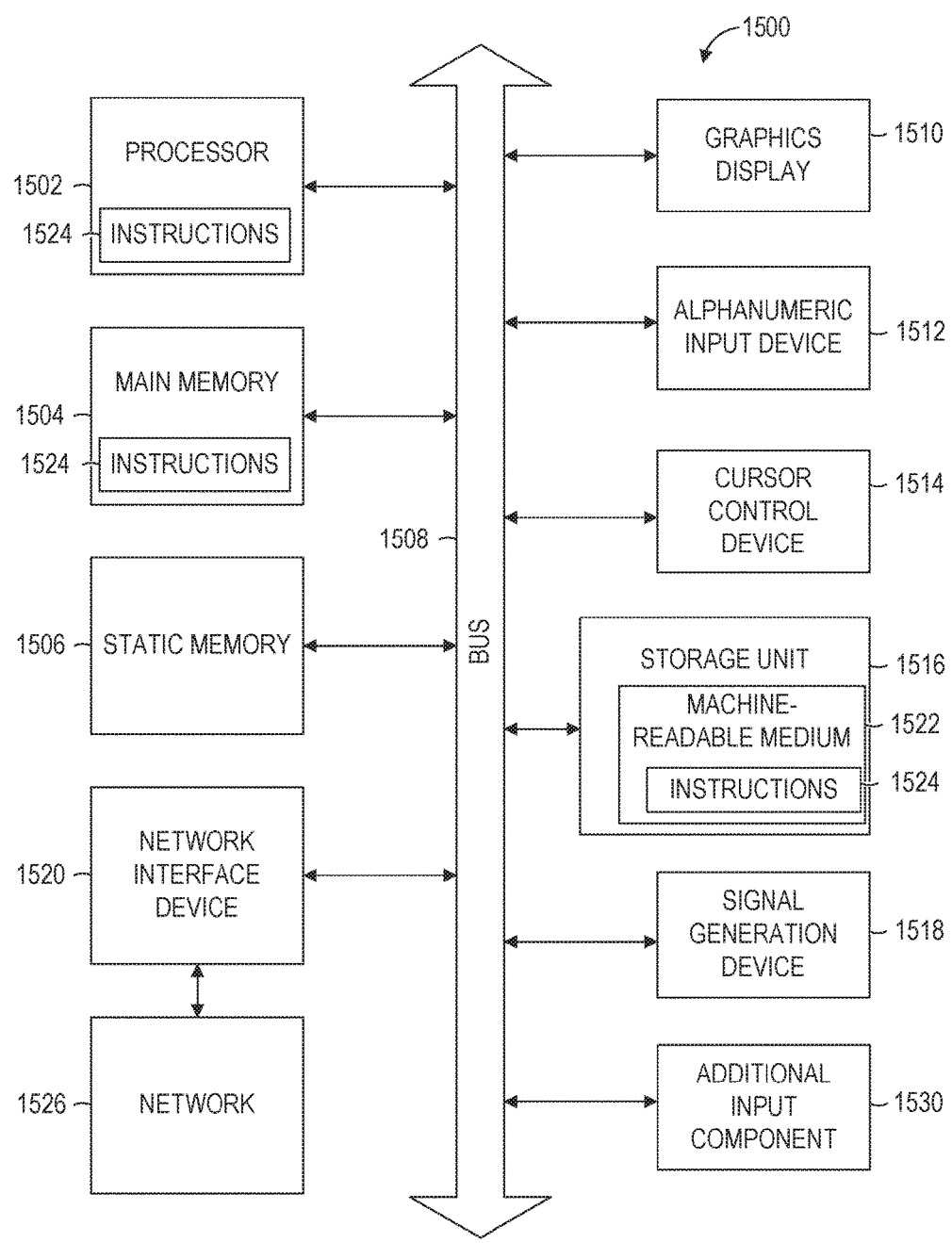
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1400, according to some example embodiments, able to read instructions 1524 from a machine-readable medium 1522 (e.g., a non-transitory machine-readable medium, a machine-readable storage medium, a computer-readable storage medium or any suitable combination thereof) and perform any one or more of the methodologies discussed herein, in whole or in part. Specifically. FIG. 15 shows the machine 1500 in the example form of a computer system (e.g., a computer) within which the instructions 1524 (e.g., software, a program, an application, an applet, an app, or other executable code) for causing the machine 1500 to perform any one or more of the methodologies discussed herein may be executed, in whole or in part.

In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain microcircuits that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a cursor control device 1514 (e.g., a mouse, a touchpad, a trackball, a joystick, a motion sensor, an eye tracking device, or other pointing instrument), a storage unit 1516, an audio generation device 1518 (e.g., a sound card, an amplifier, a speaker, a headphone jack, or any suitable combination thereof), and a network interface device 1520.

The storage unit 1516 includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered machine-readable media (e.g., tangible and non-transitory machine-readable media). The instructions 1524 may be transmitted or received over the network 1526 via the network interface device 1520. For example, the network interface device 1520 may communicate the instructions 1524 using any one or more transfer protocols (e.g., hypertext transfer protocol (HTTP)).

In some example embodiments, the machine 1500 may be a portable computing device, such as a smart phone or tablet computer, and have one or more additional input components 1530 (e.g., sensors or gauges). Examples of such input components 1530 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1524 for execution by the machine 1500, such that the instructions 1524, when executed by one or more processors of the machine 1500 (e.g., processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    generating an internal set of concept phrases based on an internal dataset that includes content from one or more internal documents associated with a social networking service (SNS), the concept phrases included in the internal set of concept phrases being one or more terms extracted from the one or more internal documents;
    generating an external set of concept phrases based on an external dataset that includes content from one or more external documents, the one or more external documents accessed from one or more sources that are external to the SNS, the concept phrases included in the external set of concept phrases being one or more terms extracted from the one or more external documents, the generating of the external set of concept phrases including:
        identifying one or more titles of the one or more external documents included in the external dataset, and
        generating one or more tokens for each of the one or more titles, the generating of the one or more tokens comprising: parsing the one or more titles of the one or more external documents, extracting the one or more terms from the one or more parsed titles of the one or more external documents, and identifying the one or more terms as the one or more tokens;
    generating a set of nodes for a universal concept graph based on performing a union operation of the internal set of concept phrases and the external set of concept phrases, each node corresponding to a particular concept phrase;
    generating a set of edges among a plurality of nodes of the set of nodes based on one or more relationship indicators for pairs of nodes of the set of nodes;
    generating, using one or more hardware processors, the universal concept graph based on the set of nodes and the set of edges among the plurality of nodes; and
    causing presentation of at least a portion of the universal concept graph in a user interface of a device associated with a user, the causing presentation of the at least the portion of the universal concept graph including causing display of one or more user interface elements for receiving input data pertaining to one or more nodes or one or more edges of the universal concept graph, a receiving of the input data via the one or more user interface elements causing generation and association of metadata with the one or more nodes or the one or more edges of the universal concept graph based on the input data received via the one or more user interface elements.

2. The method of claim 1, wherein the particular concept phrase corresponds to an identifier of an internal document or an identifier of an external document.

3. The method of claim 1, wherein the generating of the internal set of concept phrases includes:
    generating a first set of tokens based on a content of an internal document of the one or more documents, each token in the first set of tokens including one or more keywords comprised in the internal document; and
    generating a canonical version of one or more tokens in the first set of tokens based on mapping the one or more tokens to one or more external concept phrases in the external dataset, wherein the internal set of concept phrases includes the canonical version of the one or more tokens.

4. The method of claim 3, wherein the internal document is a member profile of a member of the SNS.

5. The method of claim 1, wherein the internal set of concept phrases includes at least one of a skill, an occupation title, an educational course name, a location, a company name, or a university name.

6. The method of claim 1, wherein the external set of concept phrases includes at least one of an article title of an article included in the external dataset or a keyword identified by a hyperlink in the article.

7. The method of claim 1, further comprising:
determining a relationship indicator of the one or more relationship indicators based on analyzing contents of documents associated with a pair of nodes.

8. The method of claim 7, wherein the determining of the relationship indicator comprises:
identifying a hyperlink included in a first document associated with a first document title that corresponds to a first node of the pair of nodes, the hyperlink being directed to a second document associated with a second document title that corresponds to a second node of the pair of nodes.

9. The method of claim 7, wherein the determining of the relationship indicator includes:
determining a similarity value associated with the pair of nodes based on a content similarity between a first document associated with a first document title that corresponds to a first node of the pair of nodes and a second document associated with a second document title that corresponds to a second node of the pair of nodes.

10. The method of claim 1, further comprising:
determining a percentage of content overlap between a first document associated with a first title that corresponds to a first node in a pair of nodes of the set of nodes and a second document associated with a second title that corresponds to a second node in the pair of nodes, the pair of nodes being connected by an edge of the set of edges; and
associating an edge weight with the edge based on the percentage of content overlap between the first document and the second document.

11. The method of claim 1, further comprising:
determining a percentage of members of the SNS associated with member profiles that include a first concept phrase corresponding to a first node of a pair of nodes of the set of nodes and a second concept phrase corresponding to a second node of the pair of nodes, the pair of nodes being connected by an edge of the set of edges; and
associating an edge weight with the edge based on the percentage of members of the SNS associated with member profiles that include the first concept phrase and the second concept phrase.

12. A system comprising:
one or more hardware processors; and
a non-transitory machine-readable medium for storing instructions that, when executed by the one or more hardware processors, cause the system to perform operations comprising:
generating an internal set of concept phrases based on an internal dataset that includes content from one or more internal documents associated with a social networking service (SNS), the concept phrases included in the internal set of concept phrases being one or more terms extracted from the one or more internal documents;
generating an external set of concept phrases based on an external dataset that includes content from one or more external documents, the one or more external documents accessed from one or more sources that are external to the SNS, the concept phrases included in the external set of concept phrases being one or more terms extracted from the one or more external documents, the generating of the external set of concept phrases including:
identifying one or more titles of the one or more external documents included in the external dataset, and
generating one or more tokens for each of the one or more titles, the generating of the one or more tokens comprising: parsing the one or more titles of the one or more external documents, extracting the one or more terms from the one or more parsed titles of the one or more external documents, and identifying the one or more terms as the one or more tokens;
generating a set of nodes for a universal concept graph based on performing a union operation of the internal set of concept phrases and the external set of concept phrases, each node corresponding to a particular concept phrase;
generating a set of edges among a plurality of nodes of the set of nodes based on one or more relationship indicators for pairs of nodes of the set of nodes;
generating the universal concept graph based on the set of nodes and the set of edges among the plurality of nodes; and
causing presentation of at least a portion of the universal concept graph in a user interface of a device associated with a user, the causing presentation of the at least the portion of the universal concept graph including causing display of one or more user interface elements for receiving input data pertaining to one or more nodes or one or more edges of the universal concept graph, a receiving of the input data via the one or more user interface elements causing generation and association of metadata with the one or more nodes or the one or more edges of the universal concept graph based on the input data received via the one or more user interface elements.

13. The system of claim 12, wherein the generating of the internal set of concept phrases includes:
generating a first set of tokens based on a content of an internal document of the one or more documents, each token in the first set of tokens including one or more keywords comprised in the internal document; and
generating a canonical version of one or more tokens in the first set of tokens based on mapping the one or more tokens to one or more external concept phrases in the external dataset,
wherein the internal set of concept phrases includes the canonical version of the one or more tokens.

14. The system of claim 12, wherein the operations further comprise:
determining a relationship indicator of the one or more relationship indicators based on analyzing contents of documents associated with a pair of nodes.

15. The system of claim 14, wherein the determining of the relationship indicator comprises:
identifying a hyperlink included in a first document associated with a first document title that corresponds to a first node of the pair of nodes, the hyperlink being directed to a second document associated with a second document title that corresponds to a second node of the pair of nodes.

16. The system of claim 12, wherein the operations further comprise:
   determining a percentage of content overlap between a first document associated with a first title that corresponds to a first node in a pair of nodes of the set of nodes and a second document associated with a second title that corresponds to a second node in the pair of nodes, the pair of nodes being connected by an edge of the set of edges; and
   associating an edge weight with the edge based on the percentage of content overlap between the first document and the second document.

17. A non-transitory machine-readable storage medium comprising instructions that, when executed by one or more processors of a machine, cause the machine to perform operations comprising:
   generating an internal set of concept phrases based on an internal dataset that includes content from one or more internal documents associated with a social networking service (SNS), the concept phrases included in the internal set of concept phrases being one or more terms extracted from the one or more internal documents;
   generating an external set of concept phrases based on an external dataset that includes content from one or more external documents, the one or more external documents accessed from one or more sources that are external to the SNS, the concept phrases included in the external set of concept phrases being one or more terms extracted from the one or more external documents, the generating of the external set of concept phrases including:
   identifying one or more titles of the one or more external documents included in the external dataset and
   generating one or more tokens for each of the one or more titles, the generating of the one or more tokens comprising: parsing the one or more titles of the one or more external documents, extracting the one or more terms from the one or more parsed titles of the one or more external documents, and identifying the one or more terms as the one or more tokens;
   generating a set of nodes for a universal concept graph based on performing a union operation of the internal set of concept phrases and the external set of concept phrases, each node corresponding to a particular concept phrase;
   generating a set of edges among a plurality of nodes of the set of nodes based on one or more relationship indicators for pairs of nodes of the set of nodes;
   generating the universal concept graph based on the set of nodes and the set of edges among the plurality of nodes; and
   causing presentation of at least a portion of the universal concept graph in a user interface of a device associated with a user, the causing presentation of the at least the portion of the universal concept graph including causing display of one or more user interface elements for receiving input data pertaining to one or more nodes or one or more edges of the universal concept graph, a receiving of the input data via the one or more user interface elements causing generation and association of metadata with the one or more nodes or the one or more edges of the universal concept graph based on the input data received via the one or more user interface elements.

* * * * *